United States Patent
Bartzke et al.

(10) Patent No.: US 6,586,719 B1
(45) Date of Patent: Jul. 1, 2003

(54) DEVICE FOR DETECTING THE POSITIONAL CHANGE BETWEEN TWO BODIES MOVING IN RELATION TO ONE ANOTHER

(75) Inventors: Karlheinz Bartzke, Gothe (DE); Stefan Mack, Jena (DE); Gunter Maschke, Jena (DE); Matthias Burkhardt, Eichenberg (DE); Peter Ditas, Gera (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/581,881
(22) PCT Filed: Oct. 13, 1999
(86) PCT No.: PCT/EP99/07701
§ 371 (c)(1), (2), (4) Date: Sep. 15, 2000
(87) PCT Pub. No.: WO00/23768
PCT Pub. Date: Apr. 27, 2000

(30) Foreign Application Priority Data

Oct. 17, 1998 (DE) .......................... 198 47 992

(51) Int. Cl.$^7$ ................................ G06M 7/00
(52) U.S. Cl. ........................ 250/221; 250/214 PR; 356/616
(58) Field of Search ............ 256/214 PR, 237 G, 256/221, 222.1, 229, 231.13–231.18; 340/555–557; 356/616, 621, 622

(56) References Cited

U.S. PATENT DOCUMENTS

| | | | | |
|---|---|---|---|---|
| 3,833,816 A | * | 9/1974 | Emura et al. | 250/561 |
| 3,866,053 A | * | 2/1975 | Emura et al. | 250/561 |
| 4,103,155 A | * | 7/1978 | Clark | 250/231 SE |
| 4,275,599 A | | 6/1981 | Kohlenberger et al. | |
| 4,554,451 A | * | 11/1985 | Kirstein | 250/237 G |
| 4,900,913 A | * | 2/1990 | Muro | 250/209 |
| 5,420,413 A | * | 5/1995 | Fields | 250/214 PR |
| 5,466,923 A | * | 11/1995 | Merletti | 250/214 PR |

FOREIGN PATENT DOCUMENTS

| | | |
|---|---|---|
| DE | 8298 | 10/1954 |
| DE | 24 16 399 | 10/1975 |
| DE | 26 06 434 C2 | 11/1985 |
| DE | 41 05 270 A1 | 8/1992 |
| DE | 41 24 700 A1 | 1/1993 |
| DE | 195 08 396 A1 | 9/1995 |
| EP | 0 096 152 | 12/1983 |
| FR | 2 179 224 | 11/1973 |
| JP | 5-8088608 | 5/1983 |

OTHER PUBLICATIONS

*English Abstract of DE 196 08 396 A1.
*English Abstract of DE 41 24 700 A1.
*English Abstract of DE 41 05 270 A1.
*English Abstract of DE 26 06 434 C2.
*English Abstract of DD 8298.

* cited by examiner

*Primary Examiner*—Kevin Pyo
*Assistant Examiner*—Seung C. Sohn
(74) *Attorney, Agent, or Firm*—Reed Smith LLP

(57) ABSTRACT

In an arrangement for detecting the position of two bodies moving relative to one another by a light barrier system, a device is arranged on at least one of the moving bodies such that when the bodies move relative to one another there is a change in the signal of the light barrier system that can be evaluated. At least one pair of light barrier systems is connected one with the other directly or via an electronic circuit.

6 Claims, 5 Drawing Sheets

1

DEVICE FOR DETECTING THE POSITIONAL CHANGE BETWEEN TWO BODIES MOVING IN RELATION TO ONE ANOTHER

BACKGROUND OF THE INVENTION a) Field of the Invention

The invention is directed to an arrangement for detecting the position of two bodies moving relative to one another by means of a light barrier system, wherein a device is arranged on at least one of the moving bodies such that when the bodies move relative to one another there is a change in the signal of the light barrier system that can be evaluated.

Such positioning systems are used, for example, in microscopy, where adjusting paths for the adjustment of diaphragms are in the millimeter range.

b) Description of the Art

A number of positioning arrangements aiming at adjusting and measuring paths in the millimeter range by means of light barriers are known from the prior art. In enclosed construction, light barriers are used as fork light barriers and reflection light barriers. In open construction, light transmitters and light receivers are spatially separated. Light barriers are used primarily for switching functions. Light barriers are used for path measurements through the use of lugs or tags in fork light barriers or reflectors in reflection light barriers. Miniaturized SMD components are used as light barriers and, while inexpensive, ensure measurement ranges only in the millimeter range. Hall probe path measurement systems, known in general, have a higher accuracy, but have the disadvantage of a relatively high sensitivity of the construction of the overall system to magnetic fields, oscillations, vibrations and temperature changes.

Further, the firm of Dr. Johannes Heidenhain GmbH, for example, offers a number of numeric measurement systems which measure a movement of bodies relative to one another for use in the field of mechanical engineering. Accuracies of less than 1 μm in measuring and adjusting ranges of about 100 mm are possible with these measuring systems, but the technical expenditure for these measuring systems, and therefore the price, is relatively high.

It is further known to measure the elastic deformability of the skin with a light barrier (DE-A-38 32 690). It is disadvantageous in this arrangement that measurement ranges of only about 1 mm and resolutions of only ≧10 μm can be achieved and that the measurement signals of the light barrier are corrupted by temperature influences and drift.

BRIEF AND SUMMARY OF THE INVENTION

Based on the prior art mentioned above, it is the primary object of the invention to realize an arrangement for detecting the change in position between two bodies moving relative to one another which has a relatively high positioning accuracy, is relatively compact, can be produced and assembled economically and can detect adjusting steps in a range of less than 1 μm.

According to the invention, this object is met in an arrangement of the kind mentioned above in that at least one pair of light barrier systems are connected with one another directly or via an electronic circuit and are associated with the device arranged on the bodies. According to a preferred construction of the invention, each pair of light barrier systems interacts with the device, resulting in increased sensitivity, linearization of the characteristic line and at least partial compensation of interference in the signals to be evaluated.

In an advantageous further development of the invention, the device is constructed as a diaphragm. Further, in order to achieve large measurement paths, it is advantageous when the light barrier systems are arranged so as to be fixed relative to one another and the body moving relative to the latter is provided with at least one diaphragm in the form of a wedge, each wedge passing through at least one associated pair of light barrier systems. Further, it is also advantageous to design the reflection characteristics or transmission characteristics of the diaphragm so as to be spatially dependent.

Further, drift compensation of the light barrier systems is preferably carried out by means of an electronic circuit. According to another preferred development of the invention, drift compensation is provided for each light barrier system. In another advantageous construction of the invention, drift compensation can be carried out by means of software correction.

Further, the light barrier systems are preferably operated in AC.

In the following, the invention will be described more fully by way of example with reference to schematic drawings.

Figure 4:
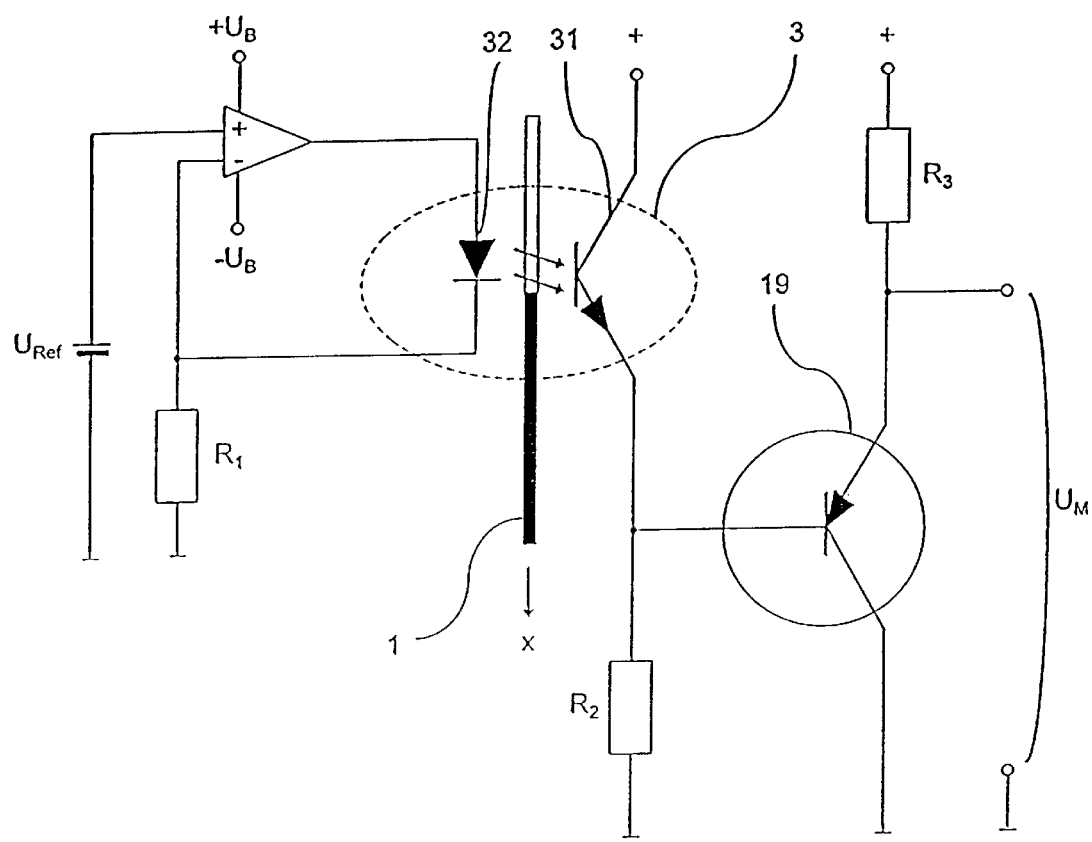
Figure 5:
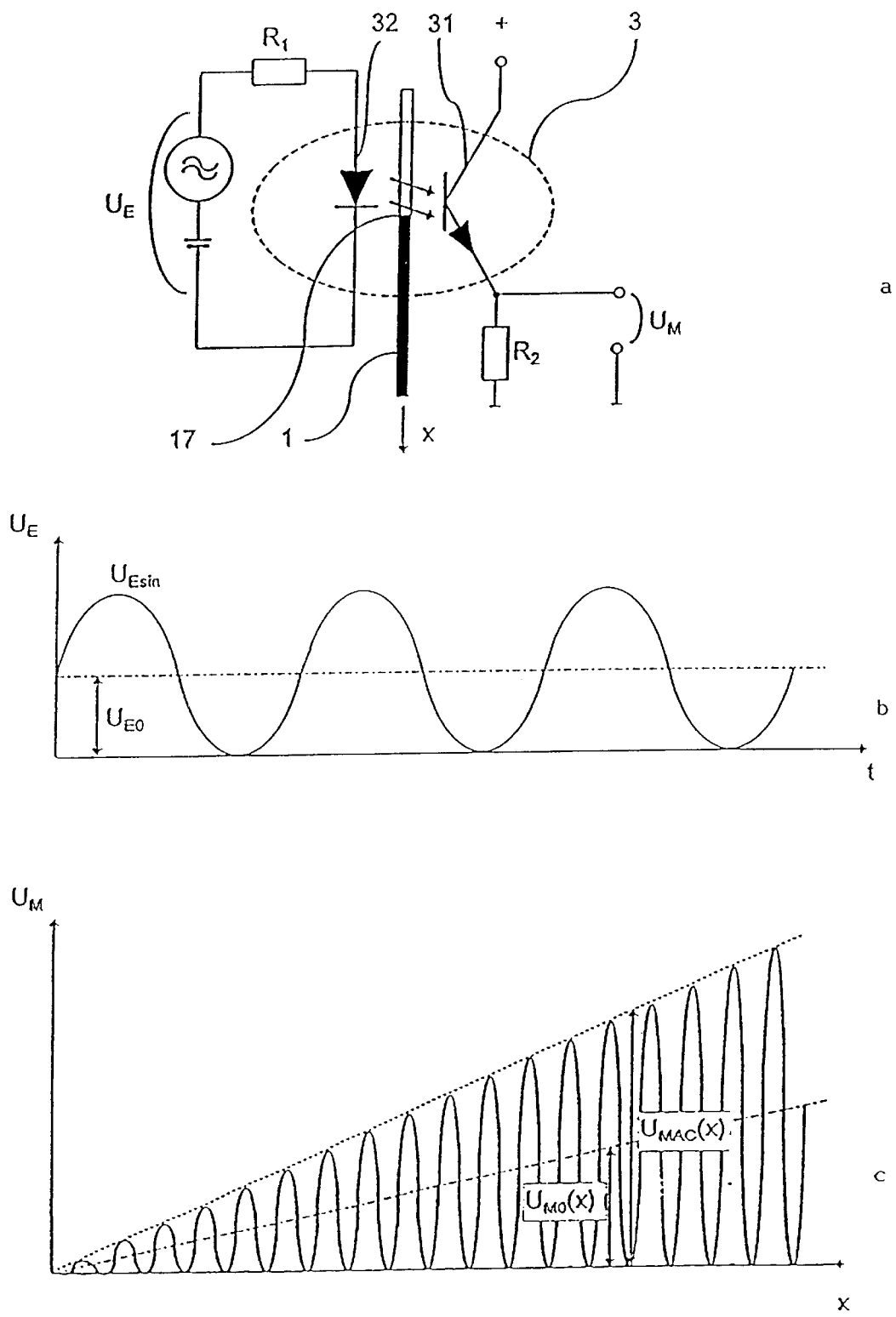
Figure 6:
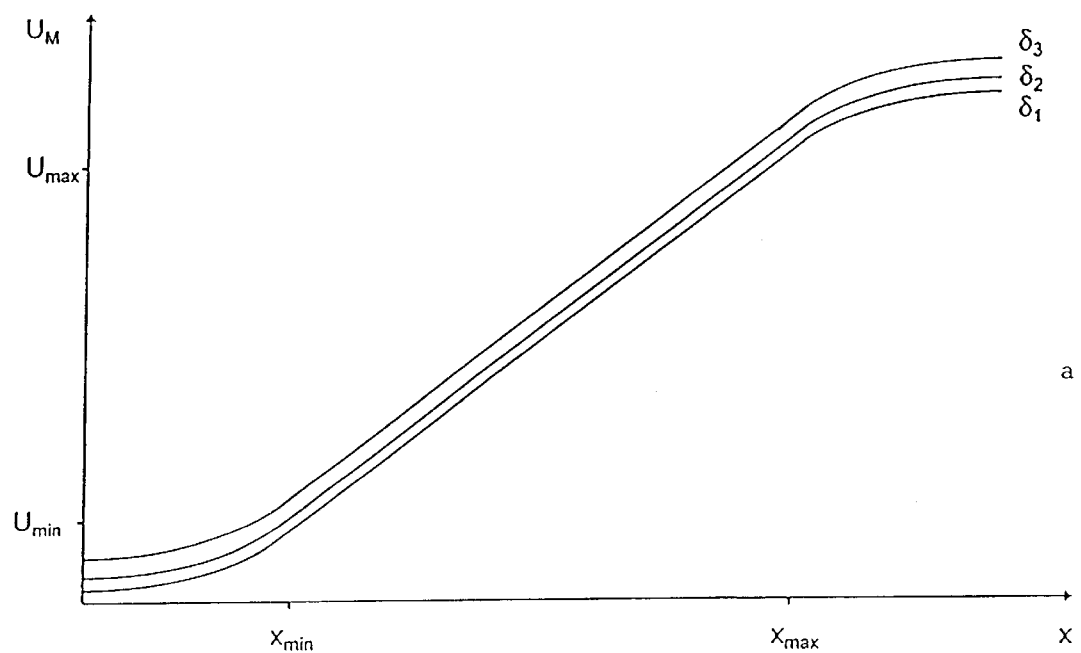
Figure 6:
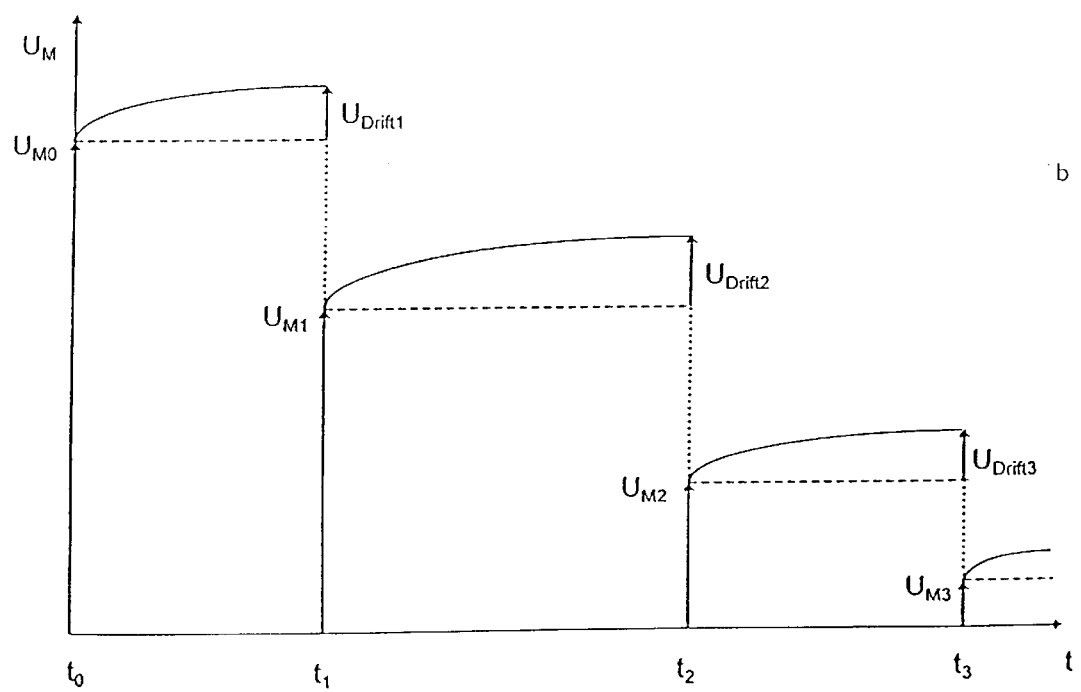

a) diaphragm with vertical reflector edge;

b) diaphragm with wedge-shaped reflector edge;

c) diaphragm with continuous reflector transition;

FIG. 4 shows a schematic view of a circuit for drift compensation in an arrangement according to the invention;

FIG. 5 shows a schematic view of the AC operating mode of a light barrier in an arrangement according to the invention, specifically:

a) a wiring diagram of the light barrier;

b) sinusoidal input voltage of the light barrier;

c) spatially-dependent output voltage of the light barrier;

FIG. 6(a) is a graph showing the relation between temperature change and a measurement voltage.

FIG. 6(b) is a graph showing the relation between the measurement voltage and time in relation to drift compensation.

DESCRIPTION OF THE PREFERRED EMBODIMENTS

Figure 1:
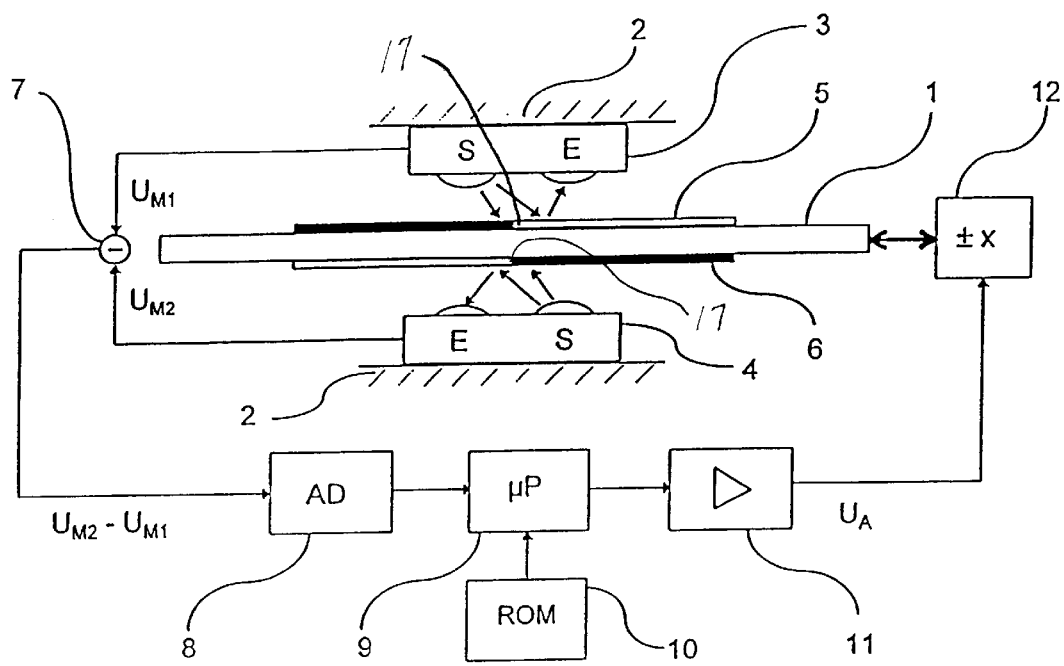
FIG. 1 shows a schematic view of an arrangement according to the invention.

FIG. 1 shows a schematic view of the positioning device according to the invention with reflection light barriers. A movable body 1 is arranged so as to be displaceable in the x-direction between a top and a bottom stationary body 2.

Two reflector diaphragms 5 and two absorber diaphragms 6 are arranged centrosymmetrically on the top and bottom of the movable body 1. Each reflector diaphragm 5 has an almost 100-percent diffuse reflection, as is available, e.g., with a Kodak neutral white test card, and each absorber diaphragm 6 reflects almost no light, as is the case with matt-black painted surfaces.

Mirror-symmetric and centrosymmetric reflection light barriers 3 and 4 forming a pair are arranged at the two inner surfaces of the stationary bodies 2 at a defined distance, e.g., 3 mm, from the diaphragms 5 and 6. Two transmitters S transmit light to the diaphragms 5 and 6. The intensities of the light reflected at the diaphragms and received by two receivers E depend on the position x of two reflector edges 17 relative to the reflection light barriers 3 or 4. A displacement of the movable body 1 relative to the stationary body 2 causes the measurement voltages $U_{M1}$, and $U_{M2}$ occurring at the light barriers to increase in one light barrier and to decrease in the other light barrier.

A differential circuit 7 subtracts these measurement voltages $U_{M1}$ and $U_{M2}$. The subtraction of measurement voltages $U_{M1}$ and $U_{M2}$ results in a doubling of the sensitivity of the position measuring system, a linearization of the characteristic with parabolic voltage wave shapes, and a partial compensation of drift and interference signals in both light barriers.

With an optimal construction of the position measurement system, the measurement range is approximately 2 mm and the maximum measurement voltage change is 4 V. The linearity of the characteristic line is better than 1%.

The measurement voltage $U_M = U_{M2} - U_{M1}$ is digitized in an A-D converter 8 and the signal is fed to a microprocessor 9. The microprocessor 9 corrects, e.g., nonlinearities of the characteristic line by correction values stored in a ROM storage 10. Further, the microprocessor 9 controls an actuator 12 via an amplifier 11 and accordingly adjusts the movable body 1. Positioning accuracies of ±1 $\mu$m can be achieved with this arrangement.

Drift of the light barriers 3 and 4 can be corrected in that the movable body 1 is moved to fixed end stops at determined time intervals by the microprocessor 9 and actuator 12 and the positioning measuring system is recalibrated by means of these known positions.

Figure 2:
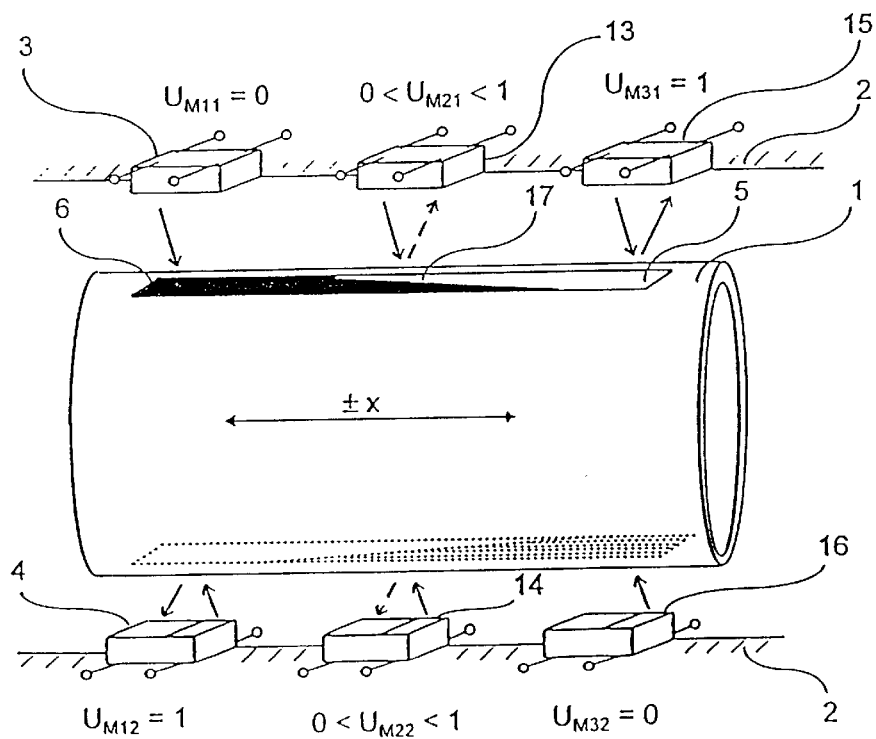
FIG. 2 shows a schematic view of another arrangement according to the invention.

FIG. 2 shows a schematic view of another positioning device according to the invention. Three light barriers 3 and 4, 13 and 14, 15 and 16 forming three light barrier pairs are attached to the top and bottom of the stationary body 2, respectively. Each of these light barrier pairs is switched differentially and generates the differential voltages $U_{M1} = U_{M12} - U_{M11}$, $U_{M2} = U_{M22} - U_{M21}$ and $U_{M3} = U_{M32} - U_{M31}$. The movable body 1 is formed, e.g., as a cylindrical lens group, a wedge-shaped reflector 5 and a wedge-shaped absorber 6 being arranged centrosymmetrically on its circumference at the top and bottom along envelope lines, the diaphragm edges 17 forming an acute angle $\alpha$ to the x-axis. The acute angle a causes an increase in the measurement range of the light barriers by a factor of about $(\tan \alpha)^{-1}$ and the three light barrier pairs make it possible, in addition, to triple the measurement range relative to the light barrier measurement range according to FIG. 1. At an angle $\alpha = 20°$, the arrangement shown can achieve a measurement range of 15 mm and, at an angle of $\alpha = 10°$, a measurement range of 30 mm. The distance between adjacent reflection light barriers is somewhat less than the extension of the reflector edge 17 in the x-direction. Accuracies of ±3 $\mu$m can be achieved when additional pairs (not shown in the drawing) of light barriers and diaphragms lying parallel adjacent to one another are included in the position determination; this results in a multiplication of the measurement voltage $U_M$. In order to prevent cross-talk in the light barriers, the passive light barriers, which do not include the reflector edge 17, are switched off.

An increase in the measurement range can also be achieved by increasing the light barrier distance to the diaphragm; but this reduces the measurement sensitivity of the arrangement.

As SMD components, the reflection light barriers used in the positioning system arrangements shown in FIGS. 1 and 2 have advantages such as compact size and low price. The use of fork light barriers requires a corresponding conversion of diaphragms 5 and 6.

Figure 3:
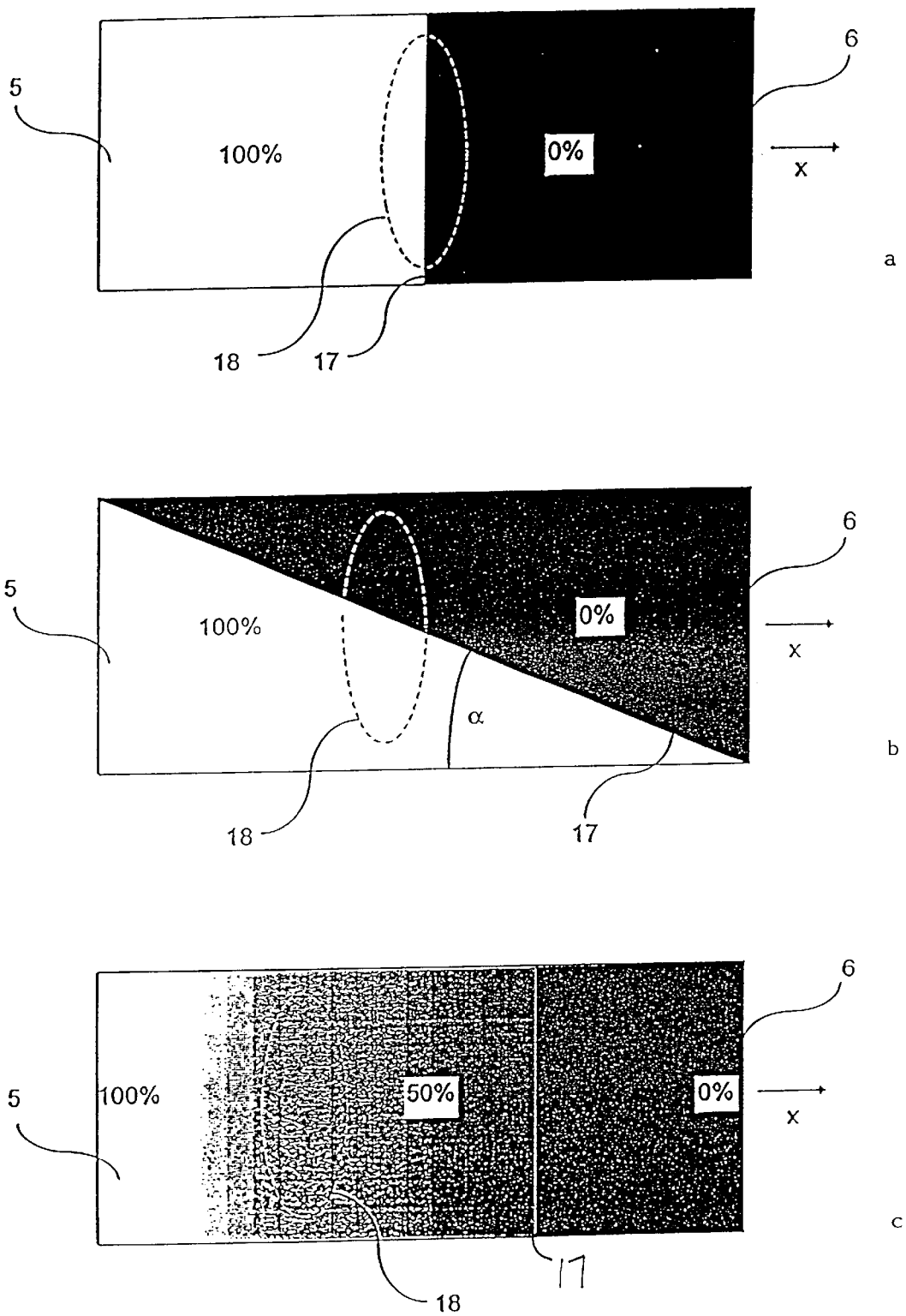
FIG. 3 shows different embodiment forms for the diaphragm that can be used in an arrangement according to the invention.

FIG. 3 shows three schematic views of usable diaphragm designs. FIG. 3a shows a diaphragm such as that used in FIG. 1. The reflector edge 17 extends vertical to the movement direction x. The reflector 5 has a reflectivity of 100% and the absorber has a reflectivity of 0%. The light spot 18 of the light barrier is displaced during an x-displacement of the diaphragm from the dark absorber to the light reflector, or vice versa, and accordingly changes its light intensity. The measurement range of the arrangement corresponds approximately to the width of the light spot in the x-direction.

FIG. 3b shows a diaphragm such as is used in FIG. 2. The reflector 5 and absorber 6 are wedge-shaped. The reflector edge 17 is arranged at an acute angle a to the x-direction. In the light spot 18 of the light barrier, the proportion of the reflector surface changes at the expense of the absorber surface, and vice versa, when the diaphragm is displaced in the x-direction. Accordingly, the light intensity of light spot 18 changes. The measurement range of the measurement system is increased approximately by a factor $(\tan \alpha)^{-1}$ and corresponds roughly to the diaphragm length minus the light spot width.

FIG. 3c shows a diaphragm in which the transition from the reflector surface to the absorber surface is continuous. In the light spot 18 of the light barrier, the reflectivity changes gradually during the displacement of the diaphragms in the x-direction. As is shown in FIG. 3b, the measurement range of the measuring system increases and corresponds approximately to the diaphragm length minus the light spot width.

Advantages of the diaphragm designs according to FIGS. 3b and 3c consist in that the increase in the measurement range of the light barrier position measuring system can be realized in a simple manner and in that a linearity error of the characteristic line of the position measuring system can be corrected by a defined nonlinear shaping of the reflector edge 17 or by a defined nonlinear transition from the 100-percent reflectivity of the reflector surface to the 0-percent reflectivity of the absorber surface.

The diaphragms shown in FIGS. 3a to 3c can be used for reflection light barriers. Similarly designed transmission diaphragms are to be used for fork light barriers.

FIG. 4 shows, as an example, a schematic view of a circuit for electronic drift compensation of the light barrier 3 as can be used in an arrangement according to the invention. Particularly due to the self-heating of a phototransistor 31 in the light barrier 3, the measurement voltage $U_M$ of the light barrier drifts and causes measurement errors in the event that no drift compensation is provided. While the drift is partially compensated by the differential circuit of the light barrier pair, complete compensation can only be achieved when the two light barriers have identical properties and are exposed to identical conditions, particularly identical light intensities.

A complete compensation of drift of the phototransistor 31 is achieved according to the invention by a circuit in which a pnp compensating transistor 19 generates a counter-drift of equal magnitude relative to the phototransistor 31. The measurement voltage $U_M$ present at the output of the circuit is then free of drift. For complete compensation of drift, the compensating transistor 19 should be directly integrated in the housing of the light barrier 3 or should at least have good thermal contact with the light barrier 3. Drift can be reduced by a factor of 3 by arranging an npn compensating transistor 19 in the immediate vicinity of the light barrier 3.

The drift of the light barrier 3 can also be compensated by an npn transistor with a modified circuit.

FIG. 5 shows a schematic view of drift compensation for the light barrier 3 by means of AC operation. The drifting of the measurement voltage $U_M$ of a light barrier is a quasi-stationary process. It changes markedly only over the course of several minutes. Alternating voltage signals of the light barrier are free from drift because they have short cycles. They offer the advantage that the light barrier can be operated free from drift.

FIG. 5a shows the wiring diagram of the light barrier 3 with an input voltage $U_E$ and a measurement voltage $U_M$.

FIG. 5b shows the sinusoidal input voltage $U_E$ of the light barrier 3 which is composed of a sine voltage $U_{Esin}$ and an offset voltage $U_{EO}$. Because of the offset voltage $U_E$, there is never a negative voltage present at the input of the light barrier. Due to the sinusoidal input voltage $U_E$, a photodiode 32 generates a sinusoidal alternating light signal fluctuating between zero and a maximum intensity.

FIG. 5c shows the measurement voltage $U_M$ which depends on the position x of the reflector edge 17 and which is formed by the action of the alternating light of the photodiode 32 on the phototransistor 31. The frequency of this measurement voltage $U_M$ is equal to the frequency of the input voltage $U_E$. The measurement voltage $U_M$ has a DC component $U_{M0}(x)$ which is linearly dependent on the position x of the reflector edge 17 and an AC component $U_{MAC}(X)$ which is linearly dependent on the position x of the reflector edge 17. The sinusoidal AC component $U_{MAC}(X)$ which contains no DC component is free from drift. Its frequency is equal to the frequency of the sinusoidal input voltage $U_E$ and its amplitude increases linearly with the position x of the reflector edge 17 from 0 to a maximum value. This AC component can be generated from the measurement signal $U_M$ of the light barrier 3 by simple electronic means that are not shown in FIG. 3a. Its effective value is a drift-free measure of the position x of the diaphragm.

FIG. 6a shows the influence exerted by a temperature change Δσ on the measurement voltage $U_M$ of the light barrier 3. A temperature increase causes a parallel displacement of the light barrier characteristic line to higher measurement voltages. This displacement can be detected and compensated by the microprocessor 9.

FIG. 6b shows how the compensation of drift of the measurement voltage $U_M$ is carried out.

A schematic view showing the software compensation of the light barrier drift according to the invention is shown in FIG. 6b. At time $t_0$, the moving body 1 has reached a fixed position $x_0$ producing a measurement voltage $U_{M0}$ at the light barrier 3, this measurement voltage $U_{M0}$ being stored by the microprocessor 9. After time point $t_0$, the measurement voltage $U_{M0}$ begins to drift. At time $t_1$, before which the position $x_0$ of the movable body 1 has remained unchanged, the drift of the measurement value reaches a value of $U_{Drift1}$ which is determined by the microprocessor 9 from the difference between the measurement voltage $U_M$ at time $t_1$ and the stored measurement voltage $U_{M0}$ at time $t_0$, and by which the measurement voltage $U_M$ at time $t_1$ is corrected. At time $t_1$, the next adjusting process begins, for which purpose the measurement voltage $U_M$ has been corrected by its drift $U_{Drift1}$. The first adjusting process should only last for a short period of approximately 1 s. During this short period, a negligibly small drift in the measurement voltage $U_M$ occurs. The measurement voltage $U_M$ changes from $U_{M0}$ to $U_{M1}$ by means of the first adjusting process. At time $t_1$, the movable body 1 has reached the new fixed position $x_1$. The microprocessor now stores the measurement voltage $U_{M1}$. During the standing period of the movable body 1 which now takes place, the measurement voltage $U_M$ begins to drift again. Before the second adjusting process at time $t_2$, the drift voltage $U_{Drift2}$ is determined by the microprocessor and is subtracted from measurement voltage $U_M$ again. The second adjusting process of the movable body 1 to the new position $x_2$ is then carried out.

This software compensation of the drift voltage is repeated before every new adjusting process. The adjusting processes of the movable body 1 are therefore free of errors caused by the drift of the light barriers.

This advantageous method for compensating measurement voltage drift $U_{Drift}$ by means of appropriate software is applicable particularly when short adjusting periods are followed by long standing periods of the positioning system. This is generally the case in microscopes in which, e.g., a short diaphragm adjustment period is followed by a longer observation period.

A recalibration of the positioning system can be carried out automatically at determined time intervals or after a number of positioning processes by moving the movable body 1 up to fixed stops and a recalibration of the position measuring system is carried out with these known positions.

While the foregoing description and drawings represent the present invention, it will be obvious to those skilled in the art that various changes may be made therein without departing from the true spirit and scope of the present invention.

| Reference Numbers | |
|---|---|
| movable body | 1 |
| stationary body | 2 |
| top light barriers | 3, 13, 15 |
| bottom light barrier | 4, 14, 16 |
| reflector diaphragm | 5 |
| absorber diaphragm | 6 |
| differential circuit | 7 |
| A–D converter | 8 |
| microprocessor | 9 |
| ROM storage | 10 |
| amplifier | 11 |
| actuator | 12 |
| reflector edge | 17 |
| light spot | 18 |
| compensating transistor | 19 |
| phototransistor | 31 |
| photodiode | 32 |

What is claimed is:

1. An arrangement for detecting the position of two bodies moving relative to one another comprising:

at least a first light barrier system and a second light barrier system;

a first device and a second device being arranged on one of the moving bodies such that when the bodies move relative to one another there is a change in signals of the light barrier systems that can be evaluated;

an electronic circuit being provided for drift compensation for the light barrier systems; and the first light barrier system being connected with the second light barrier system directly or via an electronic circuit, wherein the first light barrier system interacts with the first device and the second light barrier system interacts with the second device, wherein drift compensation is carried out for every light barrier system by operating every light barrier system in AC so that the signal of the light barrier system is an AC signal having a DC component and an AC component being drift-free and extracting the AC component from the AC signal by the electronic circuit.

2. The arrangement according to claim 1, wherein the devices are constructed as a diaphragm.

3. The arrangement according to claim 1, wherein the light barrier systems are arranged so as to be fixed relative to one another and the body moving relative to the latter is provided with at least two diaphragms in the form of a wedge, each wedge passing through at least one associated pair of light barrier systems.

4. The arrangement according to claim 1, wherein the light barrier systems are arranged so as to be fixed relative to one another and the body moving relative to the latter is provided with at least two diaphragms whose reflection characteristics or transmission characteristics are spatially dependent.

5. The arrangement according to claim 1, wherein drift compensation is carried out for every light barrier system by an electronic circuit.

6. The arrangement according to claim 1, wherein drift compensation is carried out by software means.

* * * * *